Jan. 19, 1971           H. I. GLASER          3,556,753
METHOD FOR MELTING AND PROCESSING HEAT-SOFTENABLE
MINERAL MATERIALS
Original Filed Aug. 20, 1965            2 Sheets-Sheet 1

INVENTOR
HELLMUT I. GLASER
BY
ATTORNEYS

United States Patent Office 3,556,753
Patented Jan. 19, 1971

3,556,753
METHOD FOR MELTING AND PROCESSING HEAT-SOFTENABLE MINERAL MATERIALS
Hellmut I. Glaser, Rte. 3, Pine Tree Drive,
Newark, Ohio 43055
Original application Aug. 20, 1965, Ser. No. 481,172, now Patent No. 3,401,536, dated Sept. 17, 1968. Divided and this application Sept. 12, 1968, Ser. No. 759,282
The portion of the term of the patent subsequent to Sept. 17, 1985, has been disclaimed
Int. Cl. C03b *37/00*
U.S. Cl. 65—2
4 Claims

ABSTRACT OF THE DISCLOSURE

The disclosure embraces a method of thermally conditioning and processing heat-softened glass in a stream feeder chamber by traversing the glass in both downwardly and upwardly directed paths and heating the glass to promote the effluence of gas bubbles to effect improved refinement of the glass.

---

This application is a division of my copending application Ser. No. 481,172, filed Aug. 20, 1965, issued into Pat. 3,401,536.

The present invention relates to a method of and apparatus for melting heat-softenable mineral material, such as glass, thermally conditioning and refining the heat-softened material and feeding streams of the refined material for attenuation to fine textile filaments.

Recent developments have been made in producing extremely fine filaments of glass for use in the manufacture of textiles and it is found that thermally conditioning and refining the glass to expel gases and attain a bubble-free glass is an important factor in the commercial production of fine textile filaments. In certain methods of processing glass for such purposes, the molten glass is maintained for a substantial period of time in a feeder or chamber prior to the delivery of streams of the glass for attenuation.

Refining of the glass by such methods has heretofore required that the glass be maintained for a substantial period of time, termed residence time, in a feeder chamber for comparatively slow downward movement in an endeavor to free the molten glass of bubbles of gas or seeds as gas bubbles or seeds at the region of delivery of the streams from the feeder tend to cause interruption of stream flow and filament break-outs. Filament break-outs necessitate interruption of attenuation operations to effect restart, and the "downtime" required for restarting attenuation necessarily increases the cost of producing fine textile filaments. In such methods the unidirectional downward movement of the heat-softened glass does not effectively promote sufficient interworking of the glass to obtain a high degree of refinement and the viscous condition of the glass impedes or retards the effluence or escape of gas bubbles and therefore retards the production of a bubble free glass. As the glass moves downwardly, gas bubbles must necessarily move upwardly in opposition to the glass movement and this condition further impedes the escape of gases.

The present invention embraces a method of melting glass or other heat-softenable filament-forming mineral material and thermally conditioning and refining the heat-softened glass by traversing the glass during thermal conditioning in nonlinear paths and under conditions promoting the effluence or evolution of gases within the melt to effect a high degree of refinement and homogeneity of the glass preparatory to the discharge of streams of the glass from the conditioning region.

Another object of the invention resides in the provision of a method of effecting flow or travel of the molten glass through a zone of maximum temperature in a conditioning chamber and between guide surfaces to effect upward flow of the glass from the zone of highest temperature whereby to promote the escape or effluence of gas bubbles from the upwardly moving glass to effect improved refinement of the glass.

Another object of the invention resides in a method of flowing heat-softened glass in multi-directional defined paths through a thermal conditioning chamber or region whereby to increase the flow path of the glass under differential temperature conditions and thereby increase the velocity of movement of the glass to enhance the escape or emission of gases in the glass.

Another object of the invention resides in a method of flowing molten glass through first and second zones in circuitous flow paths whereby more and larger segments of the path are available for treatment of the glass and wherein movement of the glass through the second zone is in a direction and at a low viscosity to foster the escape of bubbles of gases from the glass.

Another object of the invention resides in a method of procesing molten glass in a feeder chamber wherein the molten glass is caused to move downwardly to a zone of maximum temperature, thence upwardly to a second surface area to facilitate evolution or escape of gas bubbles from the glass by reason of the flow of the glass in the direction of normal movement of the bubbles toward the second surface area whereby to provide a substantially bubble-free glass.

Another object of the invention resides in the method of flowing molten glass downwardly in a confined zone to a region of higher temperature to reduce the viscosity of the glass, moving the low viscosity glass through the region of higher temperature and redirecting the glass upwardly through a second confined zone between closely spaced electrically heated surfaces whereby effective heat control of the confined glass is maintained in a narrow zone to foster and accelerate effluence of gas bubbles from the glass in the confined zone and the substantially bubble-free glass being redirected downwardly to a feeder zone from which streams of the refined glass are delivered for subsequent processing.

Another object of the invention resides in a feeder construction having spaced glass-confining current conducting surfaces wherein the molten glass moves through a first confined zone provided by a first surface through openings in the first surface into a second confined zone between the surfaces, the surfaces being shaped whereby the glass in the second zone moves generally upwardly to accelerate escape of gases from the glass in the second zone, and redirecting the glass from an upper region of the second zone into a feeder zone for which streams of glass are delivered for subsequent processing.

Another object of the invention resides in a melter and feeder construction wherein glass is reduced to a flowable condition in one chamber and flows successively through zones defined by spaced electrically-heated members in a second chamber and subjected to temperature gradients to refine the glass to a substantially gas-free condition and venting means provided to carry away gases evolved from the glass during its refinement.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is an elevational view of the melter and stream feeder construction of the invention in association with 3,556,753 means for attenuating filaments from streams of material delivered from the feeder;

While the method and apparatus of the invention have particular utility in conditioning and refining glass for processing into fine filaments for textile uses, it is to be understood that the method and apparatus of the invention may be employed for conditioning glass or other heat-softenable materials for other uses.

Figure 1:
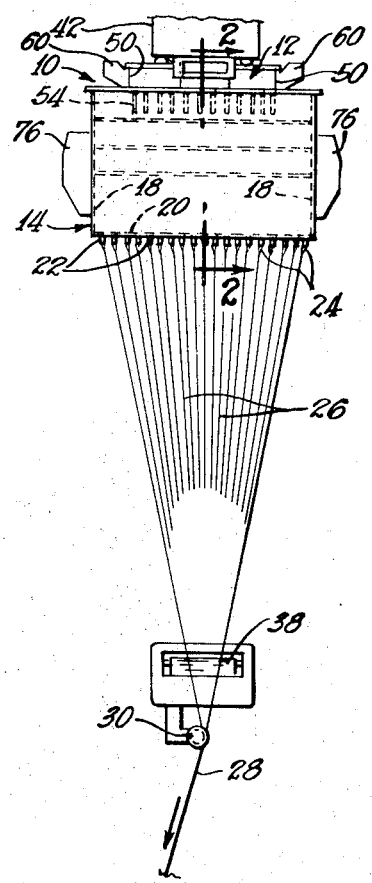
Figure 3:
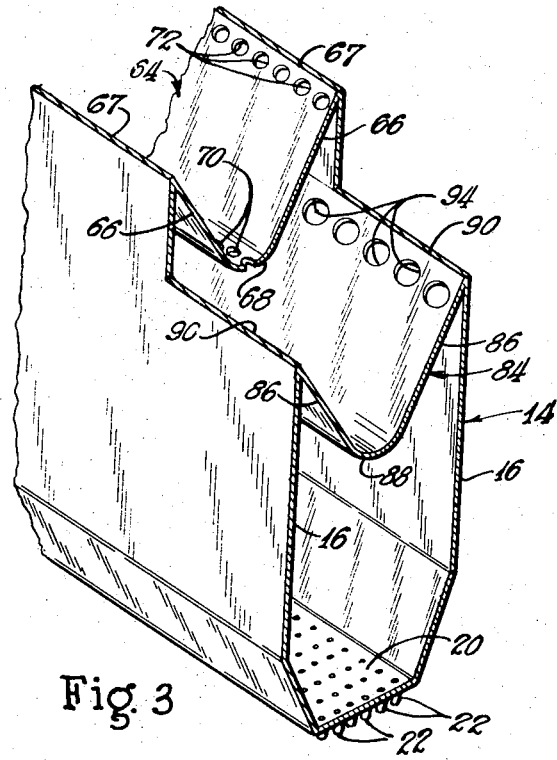
FIG. 3 is a fragmentary isometric view of the feeder construction of the invention illustrating the glass flow control arrangement.

Referring to the drawings in detail and initially to FIG. 1, the form of apparatus illustrated is particularly adaptable for melting, thermally conditioning and refining glass for attenuation to fine continuous filaments utilized for textile strands, threads or yarns. The apparatus is inclusive of a melter and stream feeder or bushing construction 10 comprising a melter or melting chamber 12 and a stream feeder or bushing construction 14, the latter receiving molten glass from the melter 12.

The feeder construction 14 is fashioned of an alloy of platinum or other material capable of withstanding the high temperature glass. The feeder is inclusive of side walls 16, end walls 18 and a floor or tip section 20. The floor or tip section 20 of the feeder is provided with one or more groups or rows of orificed projections 22 through which flow streams 24 of glass and the streams attenuated to continuous filaments 26. As shown in FIG. 1, the filaments 26 are attenuated by mechanical means, the filaments being converged to form a multi-filament strand 28, the filaments being gathered into strand formation by means of a gathering shoe 30.

The strand 28 is wound upon a collector or collecting surface such as a tubular member or thin-walled sleeve 32 telescoped onto a supporting mandrel or collet 34 driven by motive means (not shown) contained in the housing 36 of a winding machine. A lubricant, size or coating material may be applied to the filaments by an applicator 38 in advance of the region of convergence of the filaments by the shoe 30. During winding of the strand 28 on the rotating collector 32, the strand 28 is guided onto the collector by a rotatable and reciprocable traverse means 40 of conventional construction to build up a strand package of superposed layers of strand.

The traverse means 40 is configured to oscillate the strand by its rotation to effect a crossing of successive convolutions of strand on the collector, and the oscillator 40 reciprocated lengthwise of the collet to distribute the strand lengthwise of the package. Disposed above the melter 12 is a hopper 42 containing a supply of pieces of glass, such as marbles 44 of prerefined glass. The hopper is arranged as shown with respect to the melter 12 whereby the glass marbles 44 move downwardly slowly by gravity into the melter and are therein reduced to molten condition replacing the glass flowing from the melter into the feeder.

The rate of melting of the glass is automatically controlled dependent upon the rate of delivery of streams of glass from the feeder 14. The melter 12 and the feeder 14 are surrounded by refractory 46 or other suitable heat insulating material to minimize heat losses. The melter 12 is inclusive of convergingly arranged side walls 48 and end walls 50 defining a melting chamber 52. The apex region of the melter provided at a zone of convergence of the walls 48 includes two lengthwise arranged groups of wires or members 54 welded to the walls 48. The lower ends of the walls are spaced to provide an outlet or throat 56 through which molten glass flows from the melter.

Disposed between the groups of wires 54 is a vertically arranged plate 58. The lower edge of the plate 58 and the lower ends of the rods 54 preferably terminate slightly beneath the normal level of the glass in a first zone of the feeder construction. The glass from the melter chamber 52 flows through the outlet 56 downwardly along the wires 54 and the plate 58 in the form of thin film or films into the glass in the first zone of the feeder construction without turbulence so as not to impair the thermal characteristics in the feeder.

The end walls 50 of the melter 12 are provided with terminals or lugs 60 to which electric current is supplied in a conventional manner to melt the glass. The feeder construction is provided with a cover plate 61 equipped with a vent stack 62 for venting gases evolving from the glass contained in the feeder construction.

The invention embraces a method of heat-conditioning the glass in the feeder chamber 14 and flowing the glass in circuitous paths in the chamber to promote refining of the glass to dispel seeds or gas bubbles therefrom and attain improved homogeneity rendering the glass suitable for attenuation into extremely fine filaments. Disposed in the upper region of the feeder construction 14 is a first member or screen 64 which, in the embodiment illustrated, is of V-shaped configuration comprising convergingly-arranged walls 66, the upper edge regions 67 of the walls being joined by welding or other means to the upper edge regions of the side walls 16.

The converging walls or surfaces 66 are joined by an arcuately-shaped bight portion 68. The ends of the walls or surfaces 66 and bight portion 68 are joined as by welding to the end walls 18 of the feeder construction 14. The bight portion 68 of the V-shaped member 64 is provided with a group of lengthwise-arranged spaced glass flow openings or passageways 70. Arranged along the upper edge region of each of the walls 66 is a linear group of lengthwise-arranged spaced openings 72 providing vent openings for a purpose hereinafter explained.

As shown in FIG. 1, the end walls 18 of the feeder construction are provided with terminal lugs 76 for connection with an electric current which is controlled in a conventional manner by means (not shown) for heating the glass or other material in the feeder construction 14. The screen or member 64, being secured to the end walls 18 of the feeder provides a resistance heater unit for the glass adjacent the member 64, the member conducting electric current through the glass from one terminal lug 76 to the other.

The V-shaped member 64 provides a first confined zone or chamber 80 into which the molten glass or material flows from the melter 12. Disposed beneath and spaced from the member 64 is a second member 84 comprising convergingly-arranged side walls 86 connected together at their region of convergence by a curved bight portion 88, the bight portion 88 being imperforate. The ends of the walls and bight portion 88 are welded or otherwise joined to the end walls 18 of the feeder construction, and the upper edges of walls or surfaces 86 are joined to the side walls 16 of the feeder construction as indicated at 90 by welding or other means.

The comparatively narrow region 92 between members 64 and 84 provides a second confined zone or chamber into which glass is delivered from the first zone 80 through the openings 70 in the lower or bight portion of the member 64. Provided in each of the walls 86 near the juncture 90 with the side walls 16 of the feeder is a linear group of lengthwise-spaced openings or passageways 94 facilitating flow of glass from upper regions of zone 92 into the compartment or chamber 96 beneath the second member 84.

A probe 98 extends downwardly to the level of the glass immediately beneath the melter 12 in chamber 80, the probe being connected to conventional current control means (not shown) for varying current flow through the melter 12 dependent upon variations in the level of the molten glass in the chamber or zone 80 to maintain substantially constant the melting rate to continuously supply molten glass for the feeder at the throughput rate delivered through the orifices 22. Control means of this character is disclosed in Russell Pat. 3,013,095.

The flow paths of the glass from the melter 12 to the orifices 22 in the floor or tip section 20 of the feeder are as follows: The marbles or pieces 44 of glass are gradually and progressively melted by heat derived from electric current flow through the melter 12. The heat-softened or molten glass in the melter 12 flows downwardly through the throat 56 and along the wires 54 and the plate 58 inot the first confined zone or chamber 80. The molten glass in chamber 80 flows downwardly therein and through the openings 70 in the first member 64 into the apex region of the second confined zone or chamber 92 provided between the members 64 and 84.

As current is conveyed directly from the lugs 76 on the ends of the feeder construction through the screen or heater 64 and through the member 84, the glass at the apex region of zone 92 is heated to a higher temperature than that of the glass in the melter 12 and chamber 80. The region of maximum temperature of the glass is believed to be at the apex region of the second zone 92, viz zone immediately beneath the bight portion 68 of member 64. Thus the glass moving downwardly through the confined zone 80 is increased in temperature and hence its viscosity is lowered, the glass being at its lowest viscosity at or beneath the bight portion 68 of member 64.

The highly heated glass of low viscosity flows upwardly between the walls 66 and 86 through the confined zone 92 thence through the openings 94 into the feeder compartment or third zone 96. As the member 84 conducts current lengthwise through the feeder construction 14 and transfers heat to the glass, the glass flowing upwardly through the confined zone 92 is maintained at a high temperature and comparatively low viscosity. The glass moving downwardly through the chamber 96 is progressively reduced in temperature as it moves away from the second heater member or screen 86.

The glass moving downwardly through the compartment or chamber 96 moves at a slower rate providing residence time to promote homogeneity of the glass and flow in laminar planes toward the region of the orificed projections 22 where streams of gas-free refined glass are discharged from the orifices. The input of molten glass from the melter 12 is controlled at a rate to maintain the zones 92 and 96 filled with molten glass to approximately the levels shown in FIG. 2, the level of the glass in the zone 92 closely approaching the level of the glass in the first confined zone 80.

Figure 2:
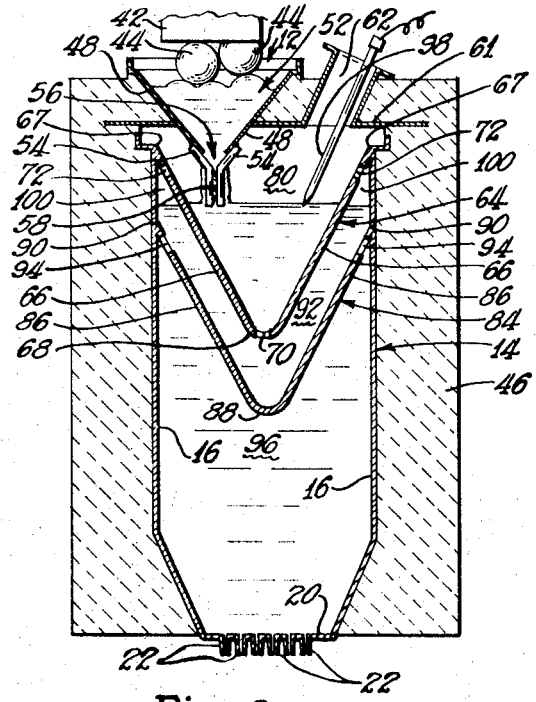
FIG. 2 is an enlarged sectional view through the melter-feeder arrangement, the view being taken substantially on the line 2—2 of FIG. 1.

As shown in FIG. 2, the level of the glass in the second zone 92 is below the vent openings 72 providing lengthwise disposed spaces or zones 100 above the glass to facilitate the delivery of gases evolved or dispelled from the glass in the zone 92 and from the compartment or third zone 96, such gases from these zones passing through the vent openings 72 and the vent stack 62 into the atmosphere.

The glass moving downwardly through the first zone 80 is increased in temperature and its viscosity lowered by heat from the heater screen or member 64 so that the glass entering the second zone 92 is of substantially higher temperature than the glass in the melter 12. By increasing the temperature of the glass, gases are evolved or given up by the glass in the first confined zone 80 and are carried away through the vent 62. The glass beneath the apex 68 changes its direction of flow upwardly through the narrow zone 92 between the walls 66 and 86, this glass being at a low viscosity as it is heated by the electric current flow through members 64 and 84.

As the glass in this region is at a low viscosity and high temperature, gases in the glass in the zone 92 move more readily upwardly through the low viscosity glass into the regions 100 through the vent openings 72 and are conveyed away through the stack 62. Gases in glass normally move upwardly, and by redirecting the glass flow upwardly in the zone 92, the upward movement of the gases is assisted by the upward flow of the glass itself in the zone 92. As the glass in zone 92 is at a low viscosity and highly fluid condition, minute bubbles of gas are given up whereby a substantially gas-free glass flows from the conditioning zone 92 through the openings 94 in the member 86 into the feeder compartment 96.

The pairs of walls 66 and 86 of members 64 and 84 are sufficiently close so that the glass in the zone 92 is heated by conduction from the heated walls 66 and 86. The upward velocity of the glass in the zone 92 is substantial because of the comparatively narrow zone between the walls 66 and 86. The increased velocity of glass in its upward movement through the zone 92 is another factor assisting in freeing the glass of minute bubbles of gas.

In the method of the invention two surface areas of glass are provided through which the gases may be given off from the glass viz the surface area of the glass in the zone 80 and the surface area of the glass in the zone 92. Gases which are not given up or evolved in the chamber 80 will be more readily given up from the higher temperature, lower viscosity glass in the zone 92. The confined zone 92, wherein the walls 66 and 86 are comparatively close, provides a narrow flow channel whereby an exacting degree of control of the temperature may be maintained by reason of the contact of the narrow body of glass with the heated surfaces of the members or screens 64 and 84.

Through this control of heating of the glass between the surfaces of the walls 66 and 86, the glass in the zone 92 is maintained during its upward flow at a substantially constant low viscosity so that there is no entrapment of gas bubbles in viscous glass as in other prior methods of glass treatment. As a result of this method of conditioning the glass, the glass at the region of the orificed projections 22 is substantially free of gas bubbles and hence the tendency for filament break-outs is greatly reduced as there are no gas bubbles adjacent the orifices in the projections 22 to interrupt or impair continuity of flow of streams through the orifices of the projections 22.

The imperforate bight portion 88 of the second screen member 84 performs an additional function. In the event that there are any particles or unmolten material in the zone 80 and such particles or unfused material move through the openings 70, they are entrapped in the bight portion 88 of the second screen member 84 and thus separated from the molten glass. Such separation is effected in part because of the greater weight of the unfused particles or stones and because of the abrupt change in direction of flow of the glass in an upward direction in the region 92.

Thus, in addition to the method providing a circuitous elongated flow path for conditioning and refining the glass, the imperforate lower region of the member or screen 84 assists in the separation or isolation of undissolved particles so that they are not carried into the feeder chamber or zone 96.

Figure 4:
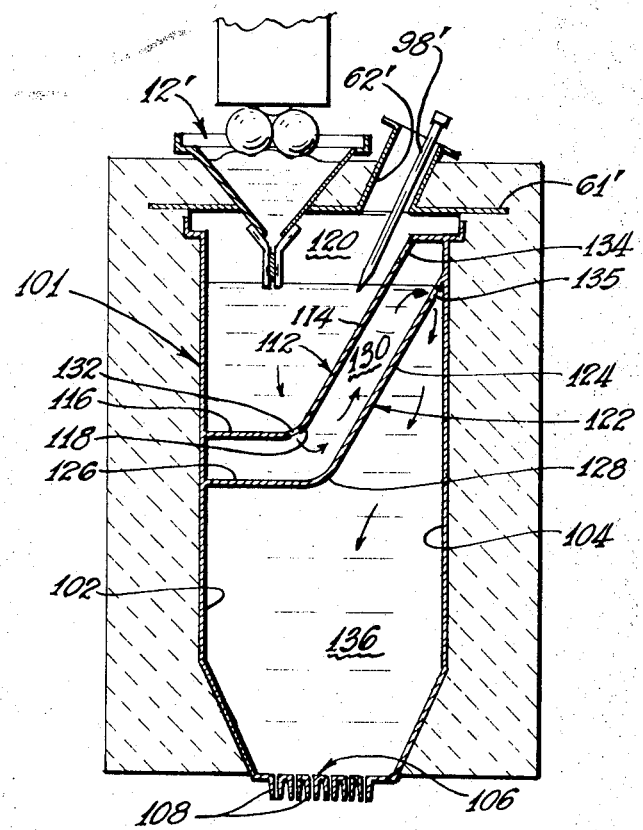
FIG. 4 illustrates a modified form of apparatus for carrying out the method of the invention.

FIG. 4 illustrates a modified form of apparatus for carrying out the method of the invention, the construction being similar in certain respects to the arrangement shown in FIG. 2. FIG. 4 illustrates a stream feeder construction or receptacle 101 of generally rectangular shape having side walls 102 and 104 joined with end walls in the manner of the construction shown in FIG. 1. The stream feeder or receptacle 101 is provided with a floor or tip section 106 having a plurality of orificed projections 108 through which streams of glass are delivered from the feeder chamber.

A melter 12' of the same construction as the melter shown in FIG. 2 is disposed above the feder construction 101 and delivers heat-softened glass into a first zone of the feeder construction, the feeder construction and melter being surrounded by refractory insulation. A cover plate 61' is provided for the feeder construction having a vent stack 62' for venting gases given off from the glass. A probe 98' extends downwardly to the level of the glass in the zone beneath the melter. The probe is connected to conventional current control means (not shown) for varying current flow through the melter 12' to maintain substantially constant the melting rate to continuously supply molten glass for the feeder.

Disposed in the upper region of the feeder construction 101 is a first member, partition or screen 112 having an upwardly extending inclined or angularly arranged surface or wall 114 and a lateral portion 116, the portions 114 and 116 being joined by a curved region or bight portion 118. The upwardly inclined surface 114 has an extension joined with the upper edge region of the wall 104 of the feeder construction, and the portion 116 joined as by welding with the side wall 102. The member or partition 112 defines a first confined zone or chamber 120 which receives heat-softened glass from the melter 12'.

Disposed beneath the member or screen 112 is a second partition, member or screen 122 having an angularly arranged or inclined wall or surface 124 preferably substantially parallel with the wall or surface 114. A laterally extending portion 126 of member 112 is joined with the inclined wall 124 by an imperforate curved bight portion 128. The upper edge of the inclined wall 124 is joined or welded to the side wall 104 and the portion 126 joined or welded to the side wall 102. The region between the members 112 and 122 is comparatively narrow and provides a second confined zone or chamber 130.

The bight portion 118 of member 112 is provided with an open area provided by a group of lengthwise spaced openings or passages 132 similar to the openings or passageways 70 shown in FIG. 2 to accommodate glass flow from the first zone 120 into the second zone 130. A portion of the inclined wall 114 of member 112 is provided with an open area provided by a group of lengthwise spaced openings or passageways 134 for venting gases given up or evolved from the glass in the zone 130 and the compartment or feeder chamber 136 beneath the member 122.

The upper region of the inclined wall 124 is provided with an open area provided by a group of lengthwise-arranged spaced passageways or orifices 135 through which glass flows from the upper region of chamber 130 into the feeder chamber or compartment 136 and through which gases may be vented from the glass in the compartment 136 to the region above the glass in chamber 130, The cross sectional area or volume of the feeder compartment or chamber 136 is substantially greater than the cross sectional area or volume of the second zone 130 whereby the glass in the second zone 130 moves upwardly at a higher velocity or rate than the movement of the glass through the feeder chamber 136.

The screens or partitions 112 and 122 are welded or joined to the end walls of the feeder construction 101 and the end walls provided with terminal lugs in the manner shown in FIG. 1 for connection with a supply of electric current. Current flows through the members 112 and 122 which serve as resistance heaters so that as the glass moves downwardly through the first zone or chamber 120, it is progressively increased in temperature and its viscosity thereby reduced. The zone of highest temperature of glass is believed to be adjacent and beneath the openings 132 in the member 112.

The glass moving upwardly in the second zone or chamber 130 is maintained at a low viscosity by heat from the screens or members 112 and 122 whereby gases in the glass in the chamber 130 move upwardly with the direction of flow of the glass and the gases are thereby more readily given off or evolved from the low viscosity glass in the chamber 130 and vented from the upper surface area of the glass. By increasing the temperature of the glass in chamber 120 as the glass moves downwardly into the second zone or chamber 130, a "reboiling" of the glass occurs resulting in freeing the glass of gases, providing a substantially gas free or highly refined glass. The gases from the chamber 130 are vented through the openings 134 and the stack 62', the gases given off from the glass in chamber 120 being vented through the stack 62'.

In the method of glass processing and refinement through the arrangement shown in FIG. 4, the glass moving downwardly through the first zone 120 is increased in temperature and its viscosity thereby reduced. The glass flows through the openings 132 into the chamber 130 thence upwardly therein, a direction of flow which assists in the escape of gases from the glass at low viscosity. The gas-free glass flows downwardly through opening 135 and through the compartment or feeder chamber 136 at a comparatively slow rate and streams of the glass delivered through the orificed projections 108 of the floor or tip section 106.

The chamber 130 is comparatively narrow to obtain effective heat control of the glass in the zone or chamber 130. As shown in FIG. 4, the bight portion 118 is preferably disposed near a central region of the feeder construction and therefore near the higher temperature zone of the glass which is usually at or near the central region of the chamber. The imperforate portions 126 and 128 assist in separating or isolating undissolved particles or stones in the glass so that they are not carried into the feeder chamber or zone 136.

While the arrangements illustrated herein involve a melter for remelting pieces or marbles of prerefined glass, it is to be understood that glass batch may be introduced into the melter and therein reduced to a molten condition. The arrangement of feeder construction may receive molten glass direct from a forehearth in lieu of the use of the melter 12. In such use, the viscosity of the glass entering the first chamber of the feeder construction may be regulated to control the delivery rate of glass.

It is apparent that, within the scope of the invention, modifications and different arrangements may be made other than as herein disclosed, and the present disclosure is illustrative merely, the invention comprehending all variations thereof.

I claim:

1. The method of processing fiber-forming mineral material including heat conditioning the material to a flowable state for circulation through a substantially common level mass, delivering the flowable material into a first zone disposed within the flowable material in a second zone, flowing the material downwardly from the first zone into the second zone, heating the material flowing downwardly through the first zone, flowing the material upwardly in the second zone disposed within the flowable material in a feeder chamber, flowing the material from an upper region of the second zone into the feeder chamber, the material in the second zone flowing upwardly from a region below the level of the material in the feeder chamber, and delivering a plurality of streams of the material from the feeder chamber.

2. The method of processing glass for attenuation to fine filaments including delivering heat-softened glass into a first chamber, flowing the glass downwardly through an open area in the bottom region of the first chamber into the bottom region of a second chamber contained within a third chamber, increasing the temperature of the glass as it flows through the first chamber and into the second chamber to reduce the viscosity of the glass, flowing the glass upwardly through the second chamber in divergent paths while maintaining the glass at a low viscosity, venting gases given off from the glass at exposed upper surface areas thereof in the second chamber, flowing the glass from upper regions of the second chamber downwardly through the third chamber, reducing the temperature of the glass in the third chamber to increase the viscosity of the glass moving through the third chamber, and continuously flowing streams of the glass from the third chamber.

3. The method of processing glass including reducing glass to a flowable condition in a melter, delivering glass from the melter into a first chamber, flowing the glass through an open area in the lower region of the first chamber into a second chamber contained within a third chamber, flowing the glass upwardly in the second chamber and through an open area in an upper region of the second chamber into the third chamber, heating the glass in the first and second chambers to maintain the glass in flowable condition with the zone of highest temperature adjacent and beneath the region of transfer of glass into the second chamber, venting the first and second chambers at regions above the glass to convey away gases evolved from the glass, and flowing streams of the glass through orifices in the floor of the third chamber.

4. The method of processing glass including melting pieces of refined glass in a melter, delivering glass from the melter into a first chamber, flowing the glass downwardly through open areas in the bottom region of the first chamber into the bottom region of a second chamber contained within a third chamber, increasing the temperature of the glass as it flows through the first chamber and into the second chamber to reduce the viscosity of the glass, flowing the glass upwardly in narrow divergent paths in the second chamber, venting gases from exposed surface areas of the glass in the first and second chambers. flowing the glass from an upper region of the second chamber into the third chamber, continuously delivering streams of the glass from the lower region of the third chamber, and attenuating the streams to filaments by winding the filaments on a rotating collector.

References Cited

UNITED STATES PATENTS

| Re. 21,863 | 7/1941 | Slayter | 65—1X |
| 2,465,283 | 3/1949 | Schlahr | 65—2UX |
| 3,048,640 | 8/1962 | Glaser | 65—2 |
| 3,401,536 | 9/1968 | Glaser | 65—1 |

S. LEON BASHORE, Primary Examiner

R. L. LINDSAY, Jr., Assistant Examiner

U.S. Cl. X.R.

13—6; 65—11, 134

UNITED STATES PATENT OFFICE
CERTIFICATE OF CORRECTION

Patent No. 3,556,753        Dated January 19, 1971

Inventor(s) Hellmut I. Glaser

It is certified that error appears in the above-identified patent and that said Letters Patent are hereby corrected as shown below:

In the heading to the printed specification, after line 5, should read -- assignor to Owens-Corning Fiberglas Corporation, a corporation of Delaware --.

Signed and sealed this 10th day of October 1972.

(SEAL)
Attest:

EDWARD M. FLETCHER, JR.            ROBERT GOTTSCHALK
Attesting Officer                    Commissioner of Pat